(12) United States Patent
Chaki

(10) Patent No.: US 7,669,216 B2
(45) Date of Patent: Feb. 23, 2010

(54) BROADCAST RECEIVING APPARATUS, BROADCAST RECEIVING METHOD AND BROADCAST RECEIVING SYSTEM

(75) Inventor: Hiroyuki Chaki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/254,466

(22) Filed: Oct. 20, 2008

(65) Prior Publication Data

US 2009/0199239 A1    Aug. 6, 2009

(30) Foreign Application Priority Data

Jan. 31, 2008    (JP)    ............... 2008-020947

(51) Int. Cl.
    G06F 3/00     (2006.01)
    G06F 13/00    (2006.01)
    H04N 5/445    (2006.01)

(52) U.S. Cl. .............. 725/48; 725/49; 725/41; 725/37; 715/717

(58) Field of Classification Search ............ 725/41, 725/43, 48, 49, 80
    See application file for complete search history.

(56) References Cited

U.S. PATENT DOCUMENTS

| | | | |
|---|---|---|---|
| 5,684,525 A * | 11/1997 | Klosterman | 725/48 |
| 6,133,910 A * | 10/2000 | Stinebruner | 725/49 |
| 6,182,094 B1 * | 1/2001 | Humpleman et al. | 715/234 |
| 6,367,080 B1 | 4/2002 | Enomoto et al. | |
| 6,904,610 B1 * | 6/2005 | Bayrakeri et al. | 725/54 |
| 2003/0177503 A1 * | 9/2003 | Sull et al. | 725/112 |
| 2006/0236342 A1 * | 10/2006 | Kunkel et al. | 725/52 |

FOREIGN PATENT DOCUMENTS

| | | |
|---|---|---|
| JP | 10-42205 | 2/1998 |
| JP | 10-51703 | 2/1998 |
| JP | 2003-87673 | 3/2003 |
| JP | 2007-43486 | 2/2007 |

* cited by examiner

Primary Examiner—John W Miller
Assistant Examiner—Robert Hance
(74) Attorney, Agent, or Firm—Blakely, Sokoloff, Taylor & Zafman LLP

(57) ABSTRACT

According to one embodiment, a broadcast receiving apparatus is equipped with a server function so as to cause a client terminal to recognize the broadcast receiving apparatus as a server on a network and to select a channel for the broadcast receiving apparatus by way of a user operation. The broadcast receiving apparatus incorporate the image of the channel selected by the client terminal in the GUI image generated by the client terminal without transmitting the actual image of the channel on the network.

7 Claims, 6 Drawing Sheets

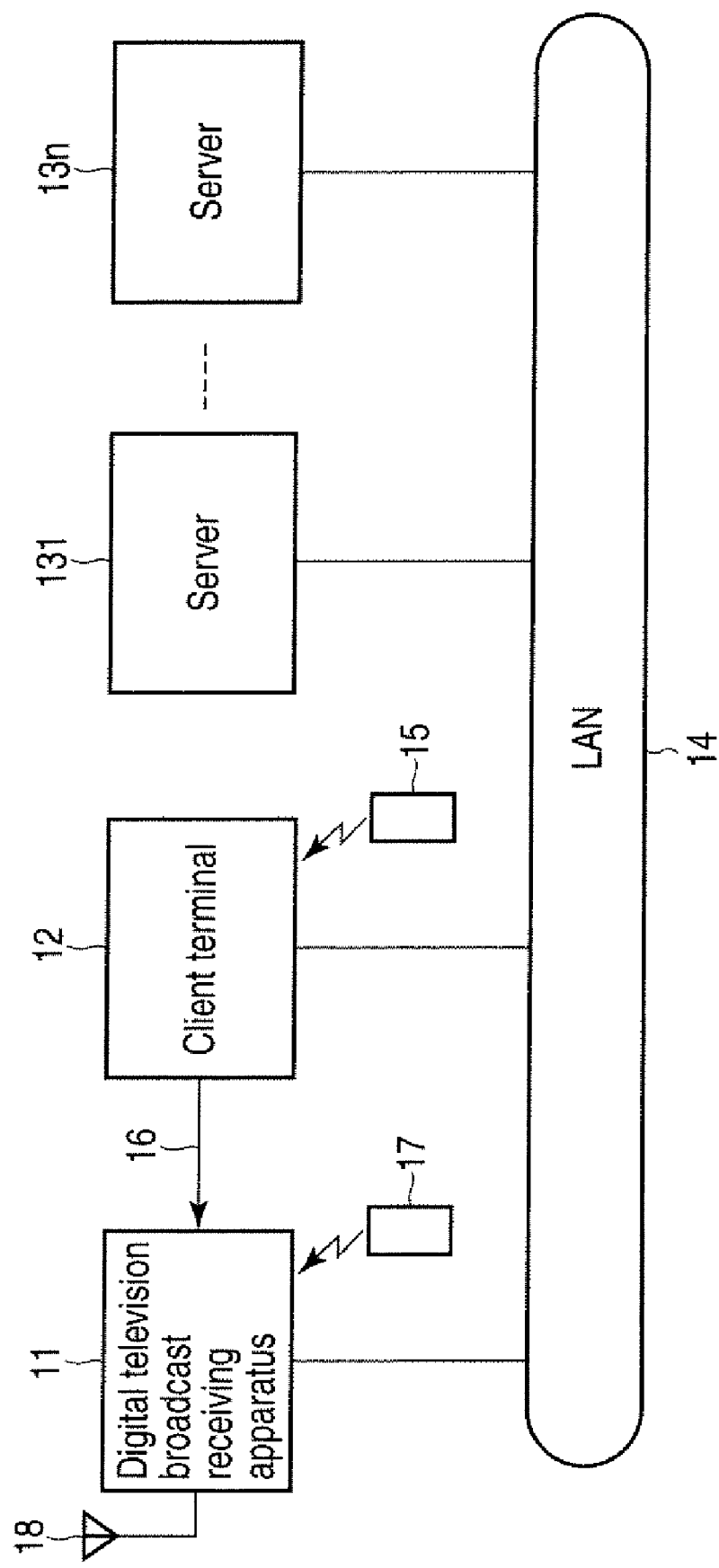
F I G. 1

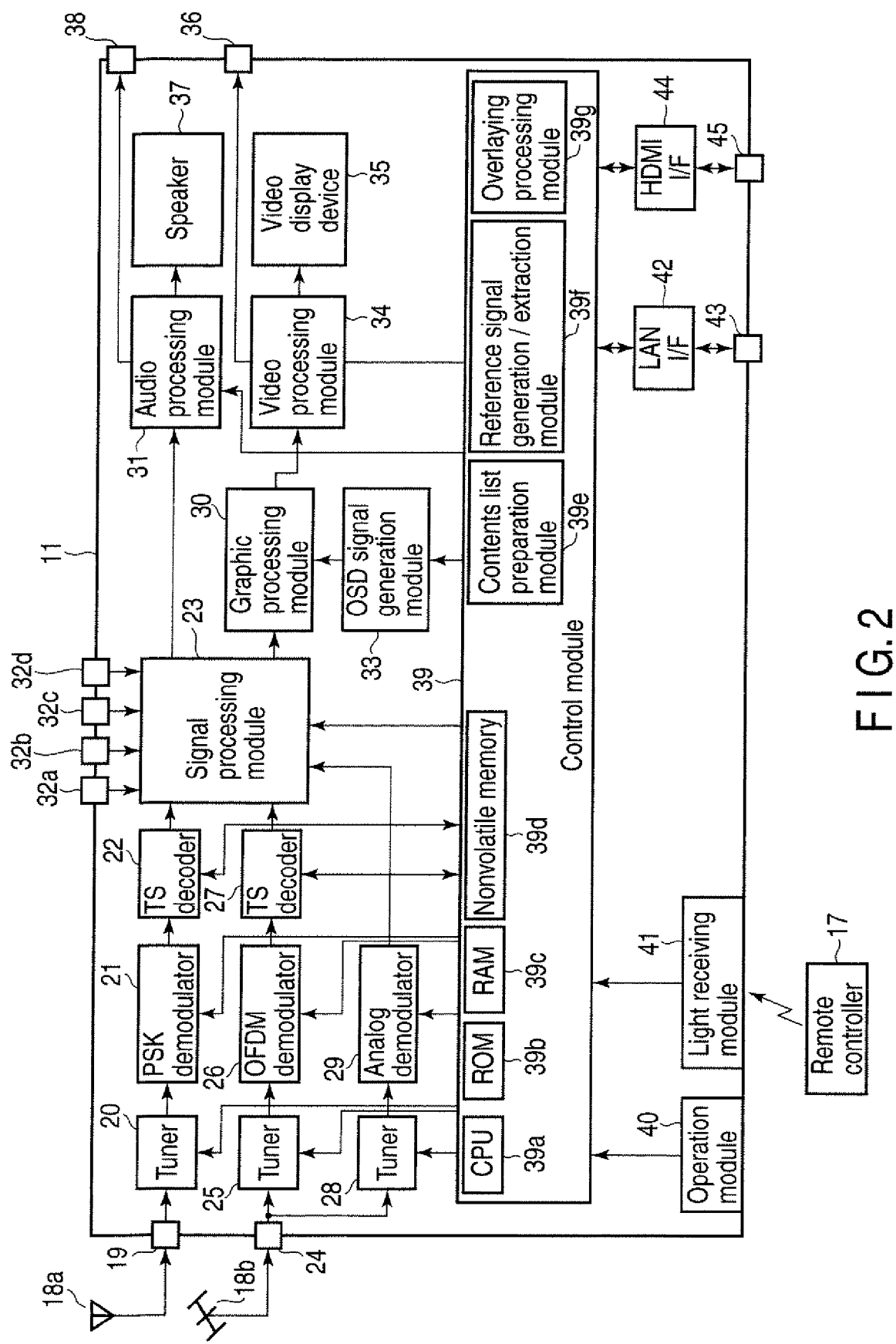
F I G. 2

US 7,669,216 B2

BROADCAST RECEIVING APPARATUS, BROADCAST RECEIVING METHOD AND BROADCAST RECEIVING SYSTEM

CROSS-REFERENCE TO RELATED APPLICATIONS

This application is based upon and claims the benefit of priority from Japanese Patent Application No. 2008-020947, filed Jan. 31, 2008, the entire contents of which are incorporated herein by reference.

BACKGROUND

1. Field

One embodiment of the invention relates to a broadcast receiving apparatus to be controlled by a client terminal when acquiring contents from a server by way of a network, a broadcast receiving method to be used under the control of the client terminal and a broadcast receiving system for receiving broadcasts under the control of a client terminal.

2. Description of the Related Art

As is well known, the guidelines proposed by the DLNA (Digital Living Network Alliance) on the basis of UPnP (universal plug and play) techniques have been adopted as standards for transmitting and receiving video contents by way of networks such as LANs (local area networks).

According to the standards, client terminals called DMAs (digital media adapters) are provided for users to acquire desired contents from any of various servers that are typically formed by PCs (personal computers) and HDDs (hard disk drives)

A client terminal has a function of selectively accessing any of various servers for data communications by way of a network and also a function of operating for data communications with television receiving sets by way of a digital interface typically conforming to the HDMI (high definition multimedia interface) Standards.

Thus, the client terminal has a function of accessing a specific server by way of a network to acquire desired contents according to the user's operation and transmitting the acquired contents to a television receiving set by way of a digital interface to have it display images and reproduce sounds.

Meanwhile, in a system where the contents acquired by a client terminal are viewed on a television receiving set, the same television set is selectively operated for viewing the contents acquired from a server by means of a client terminal and receiving and viewing a television broadcast program.

For this reason, the user is required to do an operation of switching the input mode of the television receiving set from the digital interface side to the broadcast receiving side or vice versa each time he or she views the contents acquired from a server by means of the client terminal or the television broadcast program.

Additionally, the user is required to operate the remote controller of the client terminal when the user selects a server or contents by means of the client terminal, whereas the user is required to operate the remote controller of the television receiving set when he or she selects a television broadcast channel. This is a cumbersome operation on the part of the user.

Jpn. Pat. Appln. Laid-Open Publication No. 10-051703 discloses an arrangement of compressing and transversally synthetically combining the video signal acquired from a television broadcast and the video signal acquired from the Internet so as to display either the video signal acquired from the television broadcast or the video signal acquired from the Internet on the display screen of a television set in a switched manner.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a schematic block diagram of a network system, illustrating an embodiment of the present invention;

FIG. 2 is a schematic block diagram of a digital television broadcast receiving apparatus connected to the network system of the embodiment of FIG. 1, illustrating the signal processing system of the apparatus;

DETAILED DESCRIPTION

Figure 3:
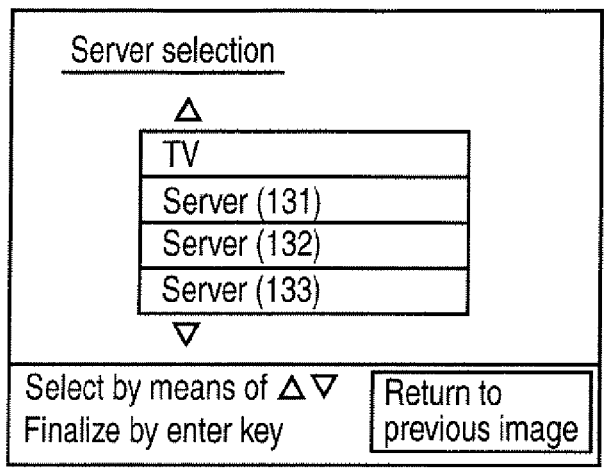
FIG. 3 is an exemplar server selection GUI image that can be displayed on the digital television broadcast receiving apparatus of the embodiment of FIG. 1.

Various embodiments according to the invention will be described hereinafter with reference to the accompanying drawings. In general, according to one embodiment of the invention, a broadcast receiving apparatus is equipped with a server function so as to cause a client terminal to recognize the broadcast receiving apparatus as a server on a network. The client terminal is designed to be capable of selecting a channel for the broadcast receiving apparatus by way a user operation, utilizing the function of selecting contents from any of the servers on the network by way of a user operation.

FIG. 1 is a schematic block diagram of a network system, illustrating an embodiment of the present invention. The network system is configured so as to connect a digital television broadcast receiving apparatus 11, a client terminal 12 that is a DMA and a plurality of servers 131 through 13n, each of which is typically formed by using a PC or an HDD on a LAN 14 so as to realize data communications conforming to the guidelines proposed by the DLNA.

In this arrangement, the client terminal 12 has a function of selectively accessing the various servers 131 through 13n by way of the LAN 14 according to the operation at the remote controller 15 and acquiring desired contents. The client terminal 12 also as a function of transmitting the contents it acquired selectively from the servers 131 through 13n to the digital television broadcast receiving apparatus 11 by way of a cable 16 in a manner conforming to the HDMI Standards or some other appropriate standards so as to display the images and reproduce the sounds of the contents.

The digital television broadcast receiving apparatus 11 can realize a function of displaying the images and reproduce the sounds of the contents supplied from the client terminal 12 by way of the cable 16 or a function of displaying the images and reproduce the sounds of the television broadcast program received by way of an antenna 18 as the remote controller 17 is operated to selectively switch the input mode from the side of the cable 16 to the side of the antenna 18 or vice versa. Note that the digital television broadcast receiving apparatus 11 can select a television broadcast channel in response to an operation at the remote controller 17.

Meanwhile, switching the input mode of the digital television broadcast receiving apparatus 11 from the side of the cable 16 to the side of the antenna 18 or vice versa depending on if viewing the contents supplied from the client terminal 12 or the television broadcast program received by the antenna 18 and operating the remote controller 15 of the client terminal 12 when selecting any of the servers 13l through 13n and contents or the remote controller 17 of the digital television broadcast receiving apparatus 11 when selecting a television broadcast channel are cumbersome to the user.

For this reason, in this embodiment, the digital television broadcast receiving apparatus 11 is equipped with the function of a server so that the client terminal 12 recognizes the digital television broadcast receiving apparatus 11 as one of the servers of the network system on the LAN 14. Thus, as the client terminal 12 utilizes the function selecting any of the servers 13l through 13n and contents according to the operation at the remote controller 15, the client terminal 12 can select a channel for the digital-television broadcast receiving apparatus 11 according to the operation of the remote controller 15.

In other words, once the input mode of the digital television broadcast receiving apparatus 11 is switched to the side of the cable 16, the user can control selecting contents from any of the servers 13l through 13n and viewing them and selecting a television broadcast channel and viewing the broadcast program only by operating the remote controller 15 of the client terminal 12. Thus, user operations are facilitated for the purpose of convenience of handling the system.

FIG. 2 is a schematic block diagram of the above-described digital television broadcast receiving apparatus 11 connected to the network system of the embodiment of FIG. 1, illustrating the signal processing system of the apparatus, which is a principal system of the digital television broadcast receiving apparatus 11. Referring to FIG. 2, the satellite digital television broadcasting signal received by antenna 18a for receiving BS/CS digital broadcasting is supplied to a tuner 20 for satellite digital broadcasting via an input terminal 19 so that consequently the desired channel is tuned in and the broadcasting signal of the channel is selected.

Then, the broadcasting signal of the channel tuned in by the tuner 20 is supplied to PSK (phase shift keying) demodulator 21 and the TS (transport stream) of the signal is demodulated. Then, the TS is supplied to TS decoder 22 and decoded to a digital video signal and a digital audio signal, which are then output to signal processing module 23.

On the other hand, the terrestrial digital television broadcasting signal received by antenna 18b for receiving terrestrial digital broadcasting is supplied to a tuner 25 for terrestrial digital broadcasting via an input terminal 24 so that consequently the desired channel is tuned in and the broadcasting signal of the channel is selected.

The broadcasting signal of the channel tuned in by the tuner 25 is supplied to an OFDM (orthogonal frequency division multiplexing) demodulator 26 and the TS of the signal is demodulated. Then, the TS is supplied to a TS decoder 27 and decoded to a digital video signal and a digital audio signal, and are then output to the signal processing module 23.

The terrestrial analog television broadcasting signal received by an antenna 18b for receiving terrestrial analog broadcasting is supplied to a tuner 28 for terrestrial analog broadcasting via the input terminal 24 so that consequently the desired channel is tuned in and the broadcasting signal of the channel is selected. The broadcasting signal selected by the tuner 28 is then supplied to analog demodulator 29 and demodulated to an analog video signal and an analog audio signal, which are then output to the signal processing module 23.

The signal processing module 23 selectively executes a predetermined digital signal processing operation on the digital video signal and the digital audio signal supplied from the TS decoder 22 or the digital video signal and the digital audio signal supplied from the TS decoder 27 and outputs them to a graphic processing module 30 and an audio processing module 31.

A plurality of (four in the illustrated instance) input terminals 32a, 32b, 32c, 32d is connected to the signal processing module 23. Each of the input terminals 32a through 32d can input an analog video signal and an analog audio signal from the outside of the digital television broadcast receiving apparatus 11.

The signal processing module 23 selectively digitizes the analog video signals and the analog audio signals supplied from the analog demodulator 29 and the input terminals 32a through 32d and executes a predetermined digital signal processing operation on the digitized video signal and the digitized audio signal, which are then output to the graphic processing module 30 and the audio processing module 31.

Of the above listed processing modules, the graphic processing module 30 has a function of overlaying an OSD signal generated by OSD (on screen display) signal generation module 33 on the digital video signal supplied from the signal processing module 23. The graphic processing module 30 can selectively output the output signal of the signal processing module 23 and the OSD signal output from the OSD signal generation module 33 and also combine the two outputs so as to make them respectively occupy the halves of the display screen.

The digital video signal output from the graphic processing module 30 is then supplied to a video processing module 34. The video processing module 34 converts the input digital video signal into an analog video signal of the format that can be displayed on video display device 35. It then outputs the analog video signal for the purpose of displaying images and also has the analog video signal led out to the outside by way of an output terminal 36.

The audio processing module 31 converts the input digital audio signal into an analog audio signal of the format that can be reproduced by a speaker 37. It then outputs the analog audio signal for the purpose of reproducing sounds and also has the analog audio signal led out to the outside by way of an output terminal 38.

The digital television broadcast receiving apparatus 11 is generally controlled by a control module 39 for all operations thereof including various signal receiving operations. The control module 39 contains a CPU (central processing unit) 39a and receives operation information from an operation module 40. The control module 39 is adapted to receive the operation information sent out from the remote controller 17 and received by a light receiving module 41 and control various component modules to reflect the operations of the remote controller 17 and the operation module 40.

More specifically, the control module 39 mainly utilizes ROM (read only memory) 39b that stores the control program that the CPU 39a executes, RAM (random access memory) 39c that provides working areas to the CPU 39a and a non-volatile memory 39d that stores various pieces of setting information and control information.

The control module 39 is connected to the LAN 14 by way of a LAN I/F (interface) 42 having the function of a server and a LAN terminal 43. As a result, the control module 39 can operate for data communications with the client terminal 12 and the various servers 131 through 13n on the LAN 14 by way of the LAN I/F 42.

Additionally, the control module 39 is also connected to the cable 16 by way of HDMI I/F 44 and HDMI terminal 45. As a result, the control module 39 can receive contents that conform to the HDMI Standards and are output from the client terminal 12 via the cable 16 by way of the HDMI I/F 44.

The control module 39 has a contents list preparation module 39e, a reference signal generation/extraction module 39f and overlaying processing module 39g. Of these modules, the contents list preparation module 39e prepares a contents list as a list relating to television broadcast channels from the service information on television broadcasting acquired in advance by way of broadcasting signals and the network (LAN 14). The contents (channel) list prepared by the contents list preparation module 39e is transmitted onto the LAN 14 by way of the LAN I/F 42 and the LAN terminal 43 in response to a request from the client terminal 12.

The reference signal generation/extraction module 39f generates a reference signal that operates as a pseudo video signal to be incorporated into the GUI (graphical user interface) image that is to be generated by the client terminal 12. A still image whose colors and design change with time is typically employed for the reference signal. The reference signal is transmitted onto the LAN 14 by way of the LAN I/F 42 and the LAN terminal 43 in response to a request from the client terminal 12.

The reference signal generation/extraction module 39f extracts the position and the size of the reference signal from the GUI image supplied from the client terminal 12 by way of the cable 16 as the reference signal is incorporated in the GUI image.

The overlaying processing module 39g has a function of overlaying the image of the television broadcast program received by the digital television broadcast receiving apparatus 11 at the position where the reference signal extracted by the reference signal generation/extraction module 39f in the GUI image supplied from the client terminal 12 by way of the cable 16 is incorporated.

Now, the operation of the above-described arrangement will be described below. The user requests the client terminal 12 to display a GUI image for server selection by operating the remote controller 15 of the client terminal 12. Then, the client terminal 12 detects all the servers 131 through 13n connected onto the LAN 14. As pointed out earlier, the client terminal 12 detects the digital television broadcast receiving apparatus 11 also as one of the servers.

The client terminal 12 generates a GUI image for server selection as shown in FIG. 3 according to the outcome of the detection. The GUI image for server selection is then output to the digital television broadcast receiving apparatus 11 by way of the cable 16 and displayed on the video display device 35 thereof. Note that the digital television broadcast receiving apparatus 11 is also included in the servers 131 through 13n in the GUI image for server selection (indicated by TV in FIG. 3).

The user selects a desired server (assume here that it is the server 131 here) and finalizes the selection by operating the remote controller 15 of the client terminal 12, seeing the GUI image for server selection displayed on the video display device 35.

Figure 4:
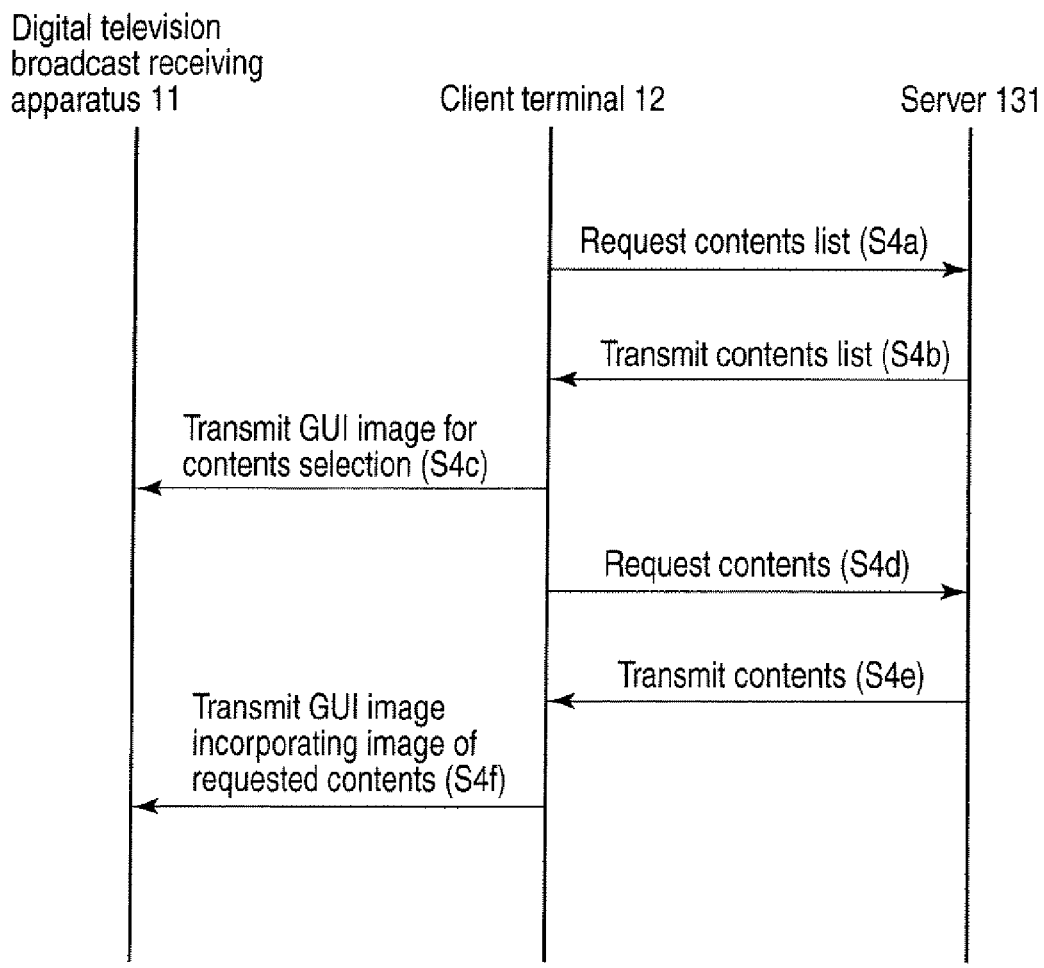
FIG. 4 is a flowchart of an exemplar processing operation that the network system of the embodiment of FIG. 1 can execute.

As a specific server 131 is specified in this way, a processing operation as shown in FIG. 4 and described below is executed. The client terminal 12 requests the server 131 the contents list by way of the LAN 14 in Step S4a and the server 131 transmits the contents list it has to the client terminal 12 by way of the LAN 14 in Step S4b.

Figure 5:
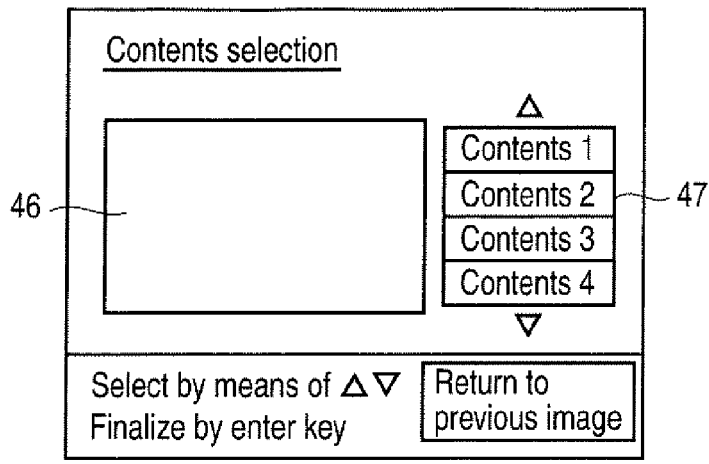
FIG. 5 is an exemplar contents selection GUI image that can be displayed on the digital television broadcast receiving apparatus of the embodiment of FIG. 1.

Then, the client terminal 12 generates a GUI image for contents selection as shown in FIG. 5 according to the contents list supplied from the server 131 and outputs the GUI image for contents selection to the digital television broadcast receiving apparatus 11 by way of the cable 16 so as to have it displayed on the video display device 35 in Step S4c.

The GUI image for contents selection has a video display region 46 and a list display region 47 for displaying the contents list. The image of the contents (for example, Contents 1 at the top of the list) that the client terminal 12 temporarily selects from the list is incorporated into the GUI image for contents selection and displayed by the client terminal 12.

Then, the user selects desired contents and finalizes the selection, seeing the list display region 47 and the contents temporarily being displayed in the video display region 46 of the GUI image for contents selection that is displayed on the video display device 35.

Now, the process until the contents are displayed in the video display region 46 will be described in detail below. The client terminal 12 requests the contents to the server 131 by way of the LAN 14 in Step S4d and the server 131 transmits the requested contents to the client terminal 12 by way of the LAN 14 in Step S4e. Note that Steps S4d and S4e are repeated each time the user selects different contents.

Subsequently, the client terminal 12 incorporates the image of the contents acquired from the server 131 into the video display region 46 of the GUI image for contents selection and outputs the GUI image to the digital television broadcast receiving apparatus 11 by way of the cable 16 to have it displayed on the video display device 35 in Step S4f.

As a result, the GUI image for contents selection where the image of the contents that the user requests is being displayed is displayed on the video display device 35 of the digital television broadcast receiving apparatus 11. Thus, the user's selection of one of the servers 131 through 13n and the operation of displaying the image of the selected contents come to a successful end.

After the contents are selected, the client terminal 12 can generate a GUI image in such a way that the video display region 46 fully occupies the display screen of the video display device 35 and transmit the GUI image to the digital television broadcast receiving apparatus 11 to have it displayed on the video display device 35.

It may be so arranged that the user can determine whether a GUI image is generated in such a way that the video display region 46 fully occupies the display screen of the video display device 35 or not by operating the remote controller 15 of the client terminal 12.

Now, an instance where the user selects the digital television broadcast receiving apparatus 11 (TV) and finalizes the selection by operating the remote controller 15 of the client terminal 12 in the GUI image for server selection as shown in FIG. 3 will be described below.

Figure 6:
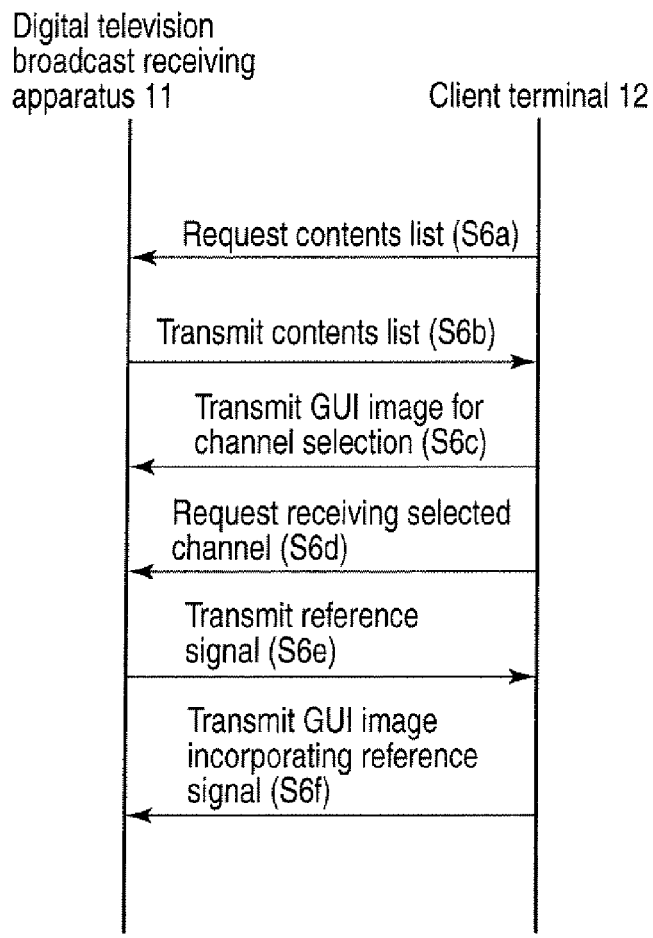
FIG. 6 is a flowchart of another exemplar processing operation that the network system of the embodiment of FIG. 1 can execute.

As the digital television broadcast receiving apparatus 11 is specified, a processing operation as shown in FIG. 6 is executed. More specifically, the client terminal 12 requests the contents list to the digital television broadcast receiving apparatus 11 by way of the LAN 14 in Step S6a. Then, the digital television broadcast receiving apparatus 11 transmits the contents (channel) list prepared by the contents list preparation module 39e to the client terminal 12 by way of the LAN 14 in Step S6b.

Figure 7:
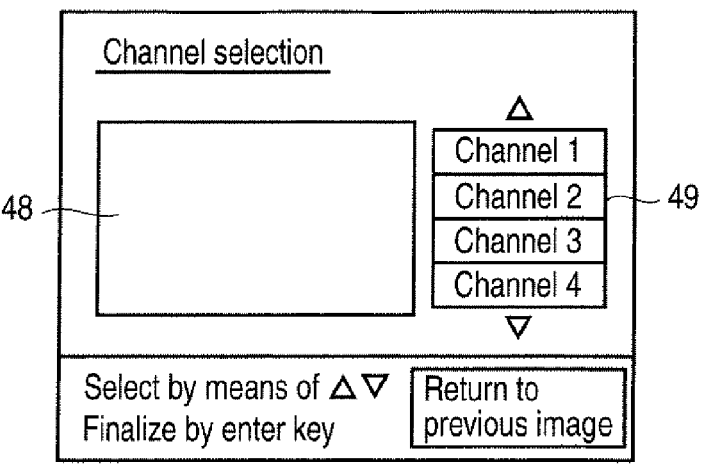
FIG. 7 is an exemplar channel selection GUI image that can be displayed on the digital television broadcast receiving apparatus of the embodiment of FIG. 1.

Thus, the client terminal 12 prepares a GUI image for channel selection as shown in FIG. 7 according to the contents (channel) list supplied from the digital television broadcast receiving apparatus 11 and outputs the GUI image for channel selection to the digital television broadcast receiving apparatus 11 by way of the cable 16 to have it displayed on the video display device 35 in Step S6c.

The GUI image for channel selection has a video display region 48 and a list display region 49 for displaying a contents (channel) list. While the image of the desired contents (channel) that the user selects by operating the remote controller 15 of the client terminal 12, seeing the image of the contents (channel) that the client terminal 12 temporarily selects from the list or the list displaying region 49 of the GUI image for channel selection being displayed on the video display device 35 is displayed in the video display region 48 of the GUI image for channel selection as in the instance where the server 131 is ultimately specified, it is not the client terminal 12 but the digital television broadcast receiving apparatus 11 that incorporates the image of the contents (channel) into the GUI image it acquires from the client terminal 12 in the GUI image for channel selection unlike the above-described instance where the server 131 is ultimately specified.

Now, the process until the contents are displayed on the video display region 48 will be described in detail below. Like the instance where the server 131 is ultimately specified, the client terminal 12 requests the digital television broadcast receiving apparatus 11 to tune in the channel that is selected and the selection of which is finalized by way of the LAN 14 in Step S6d.

Then, while the server 131 transmits the contents that correspond to the request in the above-described instance, the digital television broadcast receiving apparatus 11 transmits the reference signal it generates by the reference signal generation/extraction module 39f to the client terminal 12 by way of the LAN 14 in Step S6e.

Thus, the client terminal 12 incorporates the reference signal it acquires from the digital television broadcast receiving apparatus 11 into the video display region 48 of the GUI image for channel selection and outputs the GUI image to the digital television broadcast receiving apparatus 11 by way of the cable 16 in Step S6f.

Then, the digital television broadcast receiving apparatus 11 extracts the reference signal from the GUI image for channel selection supplied to it by way of the cable 16 by the reference signal generation/extraction module 39f to detect the position and the size of the video display region 48 in the GUI image.

On the other hand, the digital television broadcast receiving apparatus 11 tunes in the channel requested by the client terminal 12 and compresses the image obtained by the channel to the size detected by the reference signal generation/extraction module 39. Then, it incorporates the compressed image into the position detected by the reference signal generation/extraction module 39f by the overlaying processing module 39g, or the video display region 48 in the GUI image for channel selection, and has the GUI image displayed on the video display device 35.

As a result, the GUI image for channel selection where the image of the channel that the user requests is displayed in the video display region 48 is displayed on the video display device 35 of the digital television broadcast receiving apparatus 11. Thus, the user's selection of a television broadcast channel and the operation of displaying the image of the selected channel come to a successful end.

After the selection of the channel, the client terminal 12 generates a GUI image whose video display region 48 fully occupies the video display device 35 and transmits the GUI image to the digital television broadcast receiving apparatus 11 to have it displayed on the video display device 35 thereof.

It may be so arranged that the user can determine if a GUI image is generated in such a way that the video display region 48 fully occupies the display screen of the video display device 35 or not by operating the remote controller 15 of the client terminal 12.

With the above-described embodiment, the user can select any of the servers 131 through 13n and contents he or she wants and also select a television broadcast channel simply by operating the remote controller 15 of the client terminal 12 once the input mode of the digital television broadcast receiving apparatus 11 is switched to the side of the cable 16. Thus, user operations are facilitated for the purpose of convenience of handling the system.

Additionally, the digital television broadcast receiving apparatus 11 outputs a reference signal by way of the LAN 14 and the client terminal 12 generates a GUI image that incorporates the reference signal and supplies the GUI image to the digital television broadcast receiving apparatus 11 by way of the cable 16. Then, the received image of the selected channel is incorporated to the position indicated by the reference signal by the digital television broadcast receiving apparatus 11.

In other words, the data of the program being broadcast through the channel selected by the digital television broadcast receiving apparatus 11 is not output to the outside of the digital television broadcast receiving apparatus 11 at all so that they are satisfactorily protected against copying regardless if the LAN 14 and the cable 16 are adapted to protect the data being transmitted against copying or not.

Therefore, any of the various GUI images that are generated by the client terminal 12 may be transmitted to the digital television broadcast receiving apparatus 11 not by way of the cable 16 but by way of the LAN 14.

While the digital television broadcast receiving apparatus 11 and the client terminal 12 are realized as independent devices in the above-described embodiment, the client terminal 12 may alternatively be integrally incorporated into the digital television broadcast receiving apparatus 11.

Figure 8:
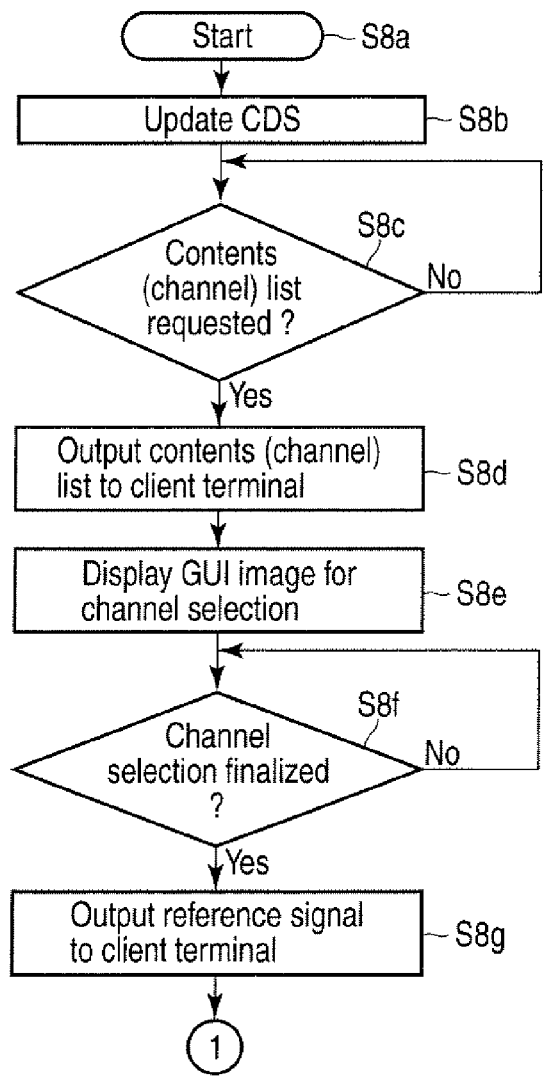
FIG. 8 is a flowchart of a part of the processing operation that the digital television broadcast receiving apparatus of the embodiment of FIG. 1 executes.
Figure 9:
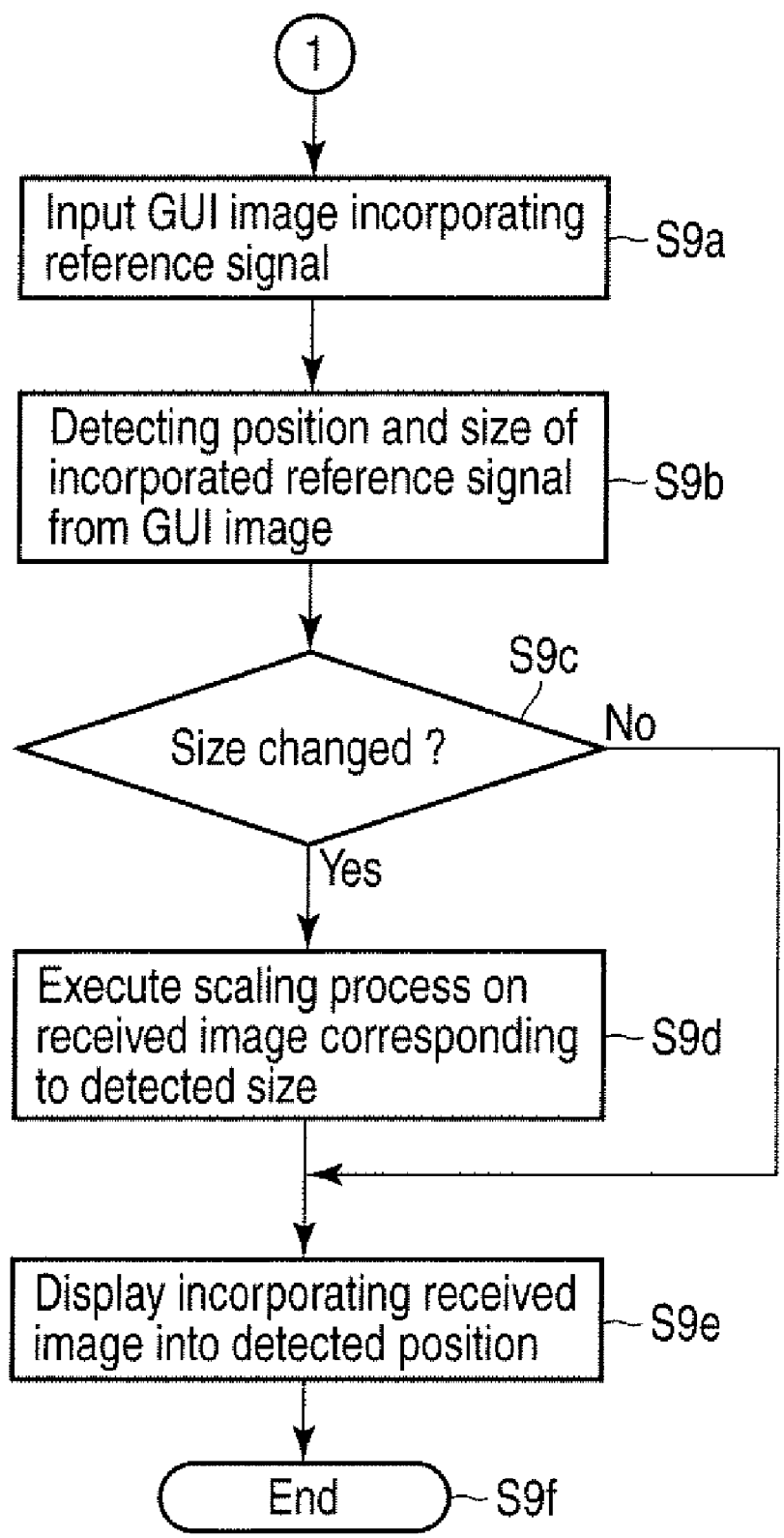
FIG. 9 is a flowchart of the remaining part of the processing operation that the digital television broadcast receiving apparatus of the embodiment of FIG. 1 executes.

FIGS. 8 and 9 show a flowchart of the main processing operations of the above-described digital television broadcast receiving apparatus 11. As the process starts (Step S8a), the control module 39 updates the CDS (content directory service) it provides in Step S8b.

More specifically, with UPnP techniques, a list of contents in the XML (extensible markup language) format that the apparatus has and the service that is provided to operate the list are defined as a server feature referred to as CDS.

With CDS, a service of receiving an operation or operations relative to a contents list as a request for an action realized by SOAP (simple object access protocol) and responding to the request is provided to the connected apparatus. SOAP is a protocol for exchanging a message on the basis of XML and the message is transmitted by means of HTTP (hypertext transfer protocol).

The XML delivered to the contents list preparation module 39e includes the types of broadcasting media such as terrestrial waves, BS (broadcasting satellite) and CS (communication satellite) and the denominations of the broadcasting stations, the channel numbers of each broadcasting medium and the titles of the programs and the genres of the programs that each broadcasting station broadcasts.

The XML includes information on video data and describes MPEG-PS (moving picture experts Group—program stream) that is the default of the DLNA as format. The contents list preparation module 39e adds data for unequivocally identifying the URL (uniform resource identifiers) that is the delivery destination of contents to each program and holds the corresponding relationship between the data and the program.

Subsequently, the control module 39 determines if it receives a request for a contents (channel) list from the client terminal 12 by way of the LAN 14 or not in Step S8c and, when it determines that it receives a request (YES), it transmits the contents (channel) list to the client terminal 12 by way of the LAN 14 in Step S8d.

Then, when the user switches the input signal to the digital television broadcast receiving apparatus 11 or when it is determined in Step S8c that the control module 39 receives a request, the control module 39 has the GUI image for channel selection supplied to it from the client terminal 12 by way of the cable 16 displayed on the video display device 35 in Step S8e. Thereafter, the control module 39 determines in Step S8f whether a channel is selected and the selection is finalized as it receives a Get method of HTTP.

With UPnP techniques, an apparatus on the LAN 14 is searched for and the presence of itself to other apparatus on the LAN 14 by means of SSDP (simple service discovery protocol). The contents list preparation module 39e notifies the client terminal 12 of the presence of itself and receives a channel selection request from the client terminal 12.

The client terminal 12 presents the contents (channel) in accordance with information of CDS in general. A reception request when the user selects a channel is performed as the GET method of the HTTP with respect to the URI corresponding to the channel. The contents list preparation module 39e identifies a channel which is requested by the URI and uses it for actual channel operation.

When it is determined in Step S8f that a channel is selected and the selection is finalized (YES), the control module 39 transmits a reference signal to the client terminal 12 by way of the LAN 14 in Step S8g. If such is the case, the control module 39 operates the reference signal generation/extraction module 39f and has it employed for the response of the Get method that the contents list preparation module 39e makes. The reference signal generation/extraction module 39f generates a reference signal, converting a still image whose colors and design change with time into the MPEG-PS format.

Thereafter, the control module 39 inputs the GUI image into which the reference signal is incorporated from the client terminal 12 by way of the cable 16 in Step S9a and extracts the reference signal from the input GUI image and detects the position where it is incorporated and its size in Step S9b.

The reference signal generation/extraction module 39f constantly monitors if the reference signal generated by the reference signal generation/extraction module 39f is overlaid in the input GUI image or not. Then, it detects the position and the size of the overlaid reference signal by means of the colors when the reference signal is formed by using a color difference or by means of the information on the difference among frames when the reference signal is formed by using a time difference.

Then, the control module 39 determines in Step S9c whether there is any change in the detected size of the reference signal or not and, if it determines that there is a change (YES), it executes a scaling process on the image of the received program to correspond to the detected size in Step S9d. Subsequently, in Step S9e, it displays the GUI image, in which the reference signal is entirely covered by the image of the program subjected to the scaling process at the position where the reference signal is detected and then ends the process (Step S9f). If, on the other hand, It is determined in Step S9c that there is not any change in the size of the detected reference signal (NO), the control module 39 moves directly to the process of Step S9e.

Thus, when there is a change in the size of the reference signal, the reference signal generation/extraction module 39f notifies the overlaying processing module 39g of information on the change. Then, the overlaying processing module 39g compresses the image of the received program to the changed size and overlays the image at the position of the detected reference signal according to the size information obtained from the reference signal generation/extraction module 39f.

The various modules of the systems described herein can be implemented as hardware, hardware and software, or components on one or more computers, such as servers. While the various modules are illustrated separately, they may share some or all of the same underlying logic.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A broadcast receiving apparatus comprising:
   a connection module configured to connect the broadcast receiving apparatus to a network such that a client terminal for acquiring contents from servers on the network can recognize the broadcast receiving apparatus as one of the servers;
   a channel list transmission module configured to transmit a channel list to the client terminal by means of the connection module, the channel list being generated from service information relating to broadcasting according to a contents list acquiring request supplied from the client terminal by means of the connection module;
   a first GUI image display module configured to cause a video display device to display a GUI image having a channel list display region and generated by the client terminal according to the channel list transmitted from the channel list transmission module;
   a reference signal transmission module configured to transmit a reference signal incorporated in a video display region of the GUI image in order to identify a position and a size of the video display region in the GUI image to the client terminal by means of the connection module when a specific channel is selected by an operation relative to the client terminal from the channel list being displayed in the channel list display region of the GUI image displayed by the first GUI image display module;

a detection module configured to extract the reference signal from the GUI image generated by the client terminal so as to incorporate the reference signal transmitted from the reference signal transmission module into the video display region and detect the position and the size of the video display region in the GUI image; and a second GUI image display module configured to receive the channel selected by the operation relative to the client terminal and causing the video display device to display a GUI image incorporating the image of the channel in the video display region detected by the detection module.

2. The apparatus according to claim 1, further comprising:
a third GUI image display module configured to cause the video display device to display a GUI image for server selection, the GUI image being generated by the client terminal by detecting a server on the network, and the GUI image displayed by the third GUI image display module includes the apparatus recognized by the client terminal as one of the servers by means of the connection module as a selectable server.

3. The apparatus according to claim 2, wherein
a specific server including the apparatus is selected as a result of an operation relative to the client terminal from the server list including the apparatus in the GUI image displayed by the third GUI image display module.

4. The apparatus according to claim 1, wherein
the GUI image generated by the client terminal is input by means of a specific digital interface arranged separately from the network.

5. The apparatus according to claim 1, wherein the GUI image generated by the client terminal is input by means of the network.

6. A broadcast receiving method comprising:
connecting a broadcast receiving apparatus to a network such that a client terminal for acquiring contents from a server on the network can recognize the broadcast receiving apparatus as one of the servers;

transmitting a channel list to the client terminal by means of the network, the channel list being generated from service information relating to broadcasting according to a contents list acquiring request supplied from the client terminal by means of the network;

causing a video display device to display a GUI image having a channel list display region and generated by the client terminal according to the transmitted channel list;

transmitting a reference signal incorporated in a video display region of the GUI image in order to identify a position and a size of the video display region in the GUI image to the client terminal by means of the network when a specific channel is selected by an operation relative to the client terminal from the channel list being displayed in the channel list display region of the GUI image;

extracting the reference signal from the GUI image generated by the client terminal so as to incorporate the transmitted reference signal into the video display region and detecting the position and the size of the video display region in the GUI image; and receiving the channel selected by the operation relative to the client terminal and causing the video display device to display the GUI image incorporating the image of the channel in the detected video display region.

7. A broadcast receiving system comprising:
a connection module designed to cause a broadcast receiving apparatus to be connected to a network such that a client terminal for acquiring contents from servers on the network can recognizes the broadcast receiving apparatus as one the servers;

a channel list transmission module designed to cause the broadcast receiving apparatus to transmit a channel list to the client terminal by means of the connection module, the channel list being generated from service information relating to broadcasting according to a contents list acquiring request supplied from the client terminal by means of the connection module;

a first GUI image display module designed to cause the broadcast receiving apparatus to input a GUI image and to display the input GUI image on a video display device, the GUI image having a channel list display region and generated by the client terminal according to the channel list transmitted from the channel list transmission module;

a reference signal transmission module configured to cause the broadcast receiving apparatus to transmit a reference signal incorporated in a video display region of the GUI image in order to identify a position and a size of the video display region in the GUI image to the client terminal by means of the connection module when a specific channel is selected by an operation relative to the client terminal from the channel list being displayed in the channel list display region of the GUI image displayed by the first GUI image display module;

a detection module configured to cause the broadcast receiving apparatus to input the GUI image generated by the client terminal, incorporating the reference signal transmitted by the reference signal transmission module in the video display region, to extract the reference signal from the input GUI image, and to detect the position and the size of the video display region in the GUI image; and a second GUI image display module configured to cause the broadcast receiving apparatus to receive the channel selected by the operation relative to the client terminal and to display on the video display device a GUI image incorporating the image of the channel in the video display region detected by the detection module.

* * * * *